US006211884B1

(12) United States Patent
Knittel et al.

(10) Patent No.: US 6,211,884 B1
(45) Date of Patent: Apr. 3, 2001

(54) INCREMENTALLY CALCULATED CUT-PLANE REGION FOR VIEWING A PORTION OF A VOLUME DATA SET IN REAL-TIME

(75) Inventors: James Knittel, Groton; Hanspeter Pfister, Somerville, both of MA (US); Frank Clare Dachille, Bayport, NY (US)

(73) Assignee: Mitsubishi Electric Research Laboratories, INC, Cambridge, MA (US)

( * ) Notice: Subject to any disclaimer, the term of this patent is extended or adjusted under 35 U.S.C. 154(b) by 0 days.

(21) Appl. No.: 09/190,303

(22) Filed: Nov. 12, 1998

(51) Int. Cl.[7] .................................................... G06T 17/00
(52) U.S. Cl. ........................ 345/424; 345/419; 345/423
(58) Field of Search .................................. 345/418, 419, 345/420, 427, 429, 433, 441, 423, 424

(56) References Cited

U.S. PATENT DOCUMENTS

| 4,736,436 | * | 4/1988 | Yasukawa et al. | 382/16 |
| 5,594,842 | * | 1/1997 | Kaufman et al. | 345/424 |
| 5,923,332 | * | 7/1999 | Izawa | 345/421 |
| 5,936,628 | * | 8/1999 | Kitamura et al. | 345/420 |

* cited by examiner

*Primary Examiner*—Cliff N. Vo
(74) *Attorney, Agent, or Firm*—Dirk Brinkman (57) ABSTRACT

A volume rendering processor establishes a cut-plane region of a volume data set, the cut-plane region being defined by a plane equation and minimum and maximum distance values representing the values of the plane equation at outer faces of the cut-plane region. The plane equation is evaluated for each sample of the volume data, the result is compared with the minimum and maximum distance values to determine whether the sample is in the cut-plane region, and the visibility of the sample is adjusted depending on the comparison result. The plane equation is evaluated by continually accumulating the coefficient values in an order indicated by the ordering of the sequence of samples. Evaluation logic includes an accumulator, a 2-input adder, registers for saving intermediate accumulated values in corresponding dimensions of the volume data, multiplexers for selecting the adder inputs from among the coefficient values, the output of the accumulator and the values in the registers, and visibility calculation logic that adjusts the samples' visibility depending on the relationship between the output of the accumulator and the minimum and maximum distance values. In an inclusive operating mode, the visibility of the sample is set to zero if it is outside the cut-plane region, and in an exclusive mode the sample's visibility is set to zero if it lies in the cut-plane region. Falloff regions at each face of the cut-plane region are used to gradually adjust sample visibility to provide a smooth appearance.

11 Claims, 6 Drawing Sheets

INCREMENTALLY CALCULATED CUT-PLANE REGION FOR VIEWING A PORTION OF A VOLUME DATA SET IN REAL-TIME

CROSS REFERENCE TO RELATED APPLICATIONS N/A

BACKGROUND OF THE INVENTION

The present invention is related to the field of computer graphics, and in particular to volume graphics.

Volume graphics is the subfield of computer graphics that deals with the visualization of objects or phenomena represented as sampled data in three or more dimensions. These samples are called volume elements, or "voxels," and contain digital information representing physical characteristics of the objects or phenomena being studied. For example, voxel values for a particular object or system may represent density, type of material, temperature, velocity, or some other property at discrete points in space throughout the interior and in the vicinity of that object or system.

Volume rendering is the part of volume graphics concerned with the projection of volume data as two-dimensional images for purposes of printing, display on computer terminals, and other forms of visualization. By assigning colors and transparency to particular voxel data values, different views of the exterior and interior of an object or system can be displayed. For example, a surgeon needing to examine the ligaments, tendons, and bones of a human knee in preparation for surgery can utilize a tomographic scan of the knee and cause voxel data values corresponding to blood, skin, and muscle to appear to be completely transparent. The resulting image then reveals the condition of the ligaments, tendons, bones, etc. which are hidden from view prior to surgery, thereby allowing for better surgical planning, shorter surgical operations, less surgical exploration and faster recoveries. In another example, a mechanic using a tomographic scan of a turbine blade or welded joint in a jet engine can cause voxel data values representing solid metal to appear to be transparent while causing those representing air to be opaque. This allows the viewing of internal flaws in the metal that would otherwise be hidden from the human eye.

Real-time volume rendering is the projection and display of volume data as a series of images in rapid succession, typically at 30 frames per second or faster. This makes it possible to create the appearance of moving pictures of the object, phenomenon, or system of interest. It also enables a human operator to interactively control the parameters of the projection and to manipulate the image, while providing to the user immediate visual feedback. It will be appreciated that projecting tens of millions or hundreds of millions of voxel values to an image requires enormous amounts of computing power. Doing so in real time requires substantially more computational power.

Further background on volume rendering is included in a Doctoral Dissertation entitled "Architectures for Real-Time Volume Rendering" submitted by Hanspeter Pfister to the Department of Computer Science at the State University of New York at Stony Brook in December 1996, and in U.S. Pat. No. #5,594,842, "Apparatus and Method for Real-time Volume Visualization." Additional background on volume rendering is presented in a book entitled "Introduction to Volume Rendering" by Barthold Lichtenbelt, Randy Crane, and Shaz Naqvi, published in 1998 by Prentice Hall PTR of Upper Saddle River, N.J.

The users of imaging systems generally need to view sections of an object. For example, in applications such as medical, geological, industrial and other scientific applications it is known to display cross sectional data corresponding to selected cross sections of a scanned object, such as the brain, organs, etc.

One known technique for displaying sections of a volume data set employs what are referred to as "clip planes". A clip plane is an imaginary plane intersecting the volume data set at a location and orientation defined by a clip plane equation established by volume rendering software. Sets of two or more clip planes can be defined in a manner such that only the region of the volume data set between clip planes is displayed.

However, the calculations that are associated with use of clip planes are processing-intensive. Further, the complexity of the calculations is in part a function of the orientation of the clip plane with respect to the volume data set. Consequently, real-time manipulation of a volume data set with clip planes is difficult to achieve using presently known techniques.

It would be desirable to enable the display of arbitrary sections of an object represented by volume data without incurring substantial processing penalties such as are entailed by the use of clip planes.

BRIEF SUMMARY OF THE INVENTION

In accordance with the present invention, a pipelined volume rendering processor is disclosed which is capable of displaying a slab-like section of an object referred to as a "cut-plane region". The processing required to implement the cut-plane region is an incremental addition to the rendering pipeline, resulting in only a negligible impact on the throughput of the rendering processor.

In the disclosed rendering processor, a cut-plane region is defined in terms of a single plane equation and a thickness. The plane equation is evaluated for each sample of the volume data, and the result is compared with predetermined minimum and maximum values to determine whether the sample is inside or outside the cut-plane region. In an inclusive mode, data points outside of the cut-plane region are cropped from the data set, so that only those data points inside remain visible. In an exclusive mode, data points inside the cut-plane region are cropped from the data set. The plane equation that describes the cut-plane region is evaluated as the data set is traversed in three orthogonal dimensions by continually accumulating values of the plane equation. Multiplication operations are avoided, so that the circuitry required to determine whether a sample is inside or outside the cut-plane region is simplified. Also, the evaluation and cropping operations are performed as further steps in a processing pipeline. The latency in the pipeline is incrementally increased, but rendering throughput is not affected.

A smoothing function may be employed to enhance the view provided by the cut-plane region. In particular, the opacity of sample points near the faces of the cut-plane region can be adjusted to provide a smooth appearance to the displayed image. Transition regions at each face of the cut-plane region are employed to select sample points for opacity adjustment. In the inclusive mode, the opacity value ($\alpha$) of sample points that are outside of the cut-plane is set to zero. The opacity value ($\alpha$) of sample points in the transition regions is adjusted by a correction factor that ranges linearly between zero and one depending upon the proximity of the sample point to the interior of the cut plane. In the exclusive mode, the opacity value of sample points in the transition regions is decreased by a linear correction factor that ranges from one to zero in proportion to the proximity of the sample point to the interior of the cut-plane.

BRIEF DESCRIPTION OF THE SEVERAL VIEWS OF THE DRAWING

The foregoing features of this invention, as well as the invention itself, may be more fully understood from the following Detailed Description of the Invention, and Drawing, of which.

DETAILED DESCRIPTION OF THE INVENTION

Figure 1:
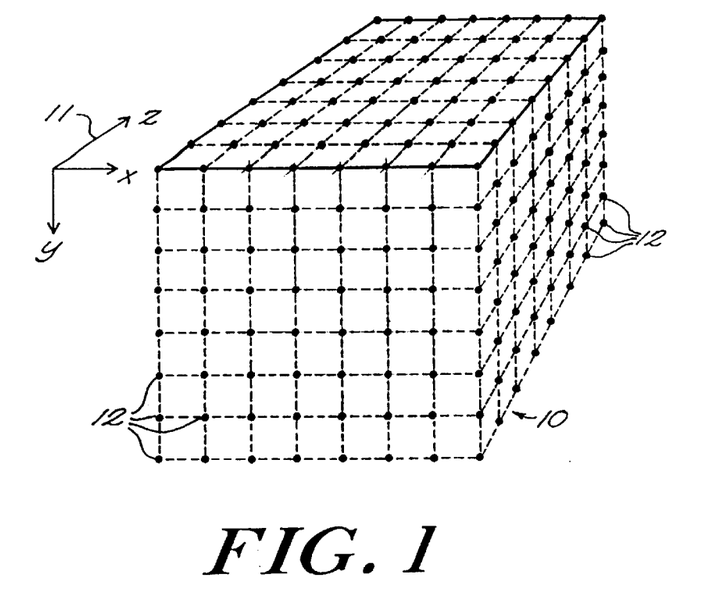
FIG. 1 is a diagrammatic illustration of a volume data set.

Referring now to FIG. 1 and by way of further background, a view of a three-dimensional volume data set 10 is shown. FIG. 1 depicts an array of voxel positions 12 arranged in the form of a rectangular solid. More particularly, the voxel positions fill the solid in three dimensions and are uniformly spaced. The position of each voxel can be represented in a coordinate system defined by the three axes 11 labeled X, Y, and Z. Associated with each voxel position is one or more data values representing some characteristics of the object, system, or phenomenon under study, for example density, type of material, temperature, velocity, opacity or other properties at discrete points in space throughout the interior and in the vicinity of that object or system. It is convenient to represent a volume data set in a computer as a three-dimensional array of values, with the value at array index position (X, Y, Z) corresponding to the volume data values at coordinates (X, Y, Z) in three-dimensional space.

Figure 2:
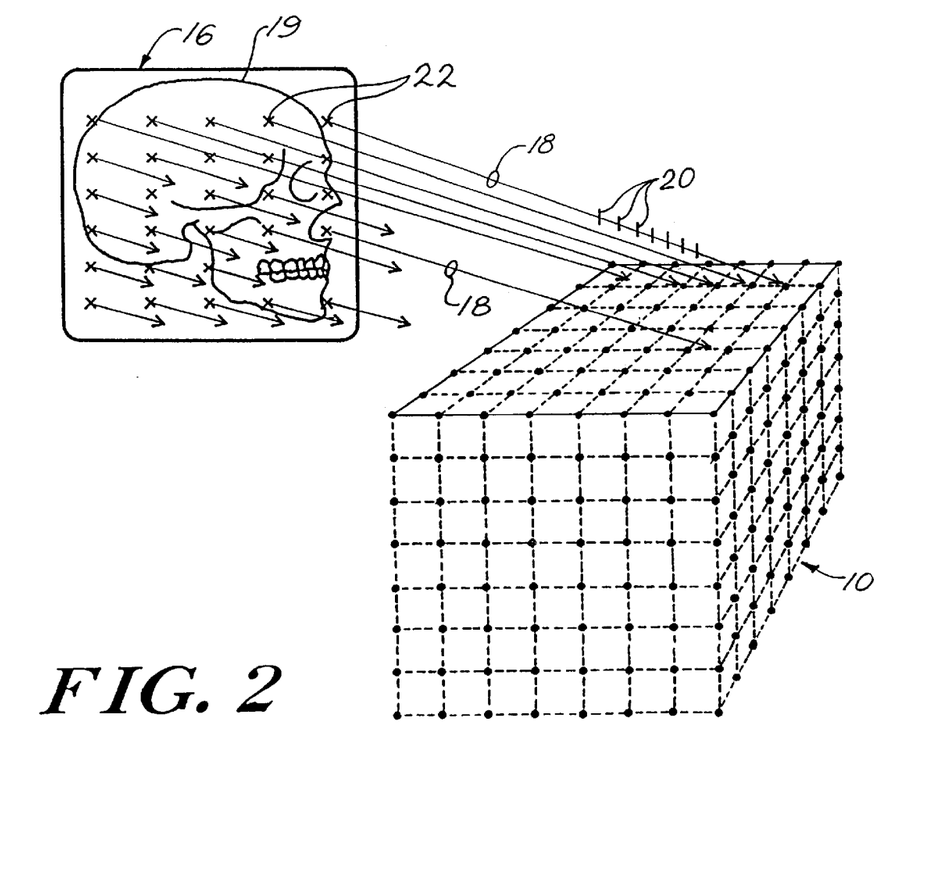
FIG. 2 is a diagrammatic illustration of a view of a volume data set being projected onto an image plane by means of ray-casting.

FIG. 2 illustrates an example of a volume data set 10 comprising an array of slices from a tomographic scan of the human head. A two-dimensional image plane 16 represents the surface on which a volume rendered projection of the human head is to be displayed. In a technique known as ray-casting, rays 18 are cast from pixel positions 22 on the image plane 16 through the volume data set 10, with each ray accumulating color and opacity from the data at voxel positions as it passes through the volume. In this manner the color, transparency, and intensity as well as other parameters of a pixel are extracted from the volume data set as the accumulation of data at sample points 20 along the ray. In this example, voxel values associated with bony tissue are assigned an opaque color, and voxel values associated with all other tissue in the head are assigned a transparent color.

Therefore, the result of accumulation of data along a ray and the attribution of this data to the corresponding pixel result in an image 19 in viewing plane 16 that appears to an observer to be an image of a three-dimensional skull, even though the actual skull is hidden from view by the skin and other tissue of the head.

Figure 3:
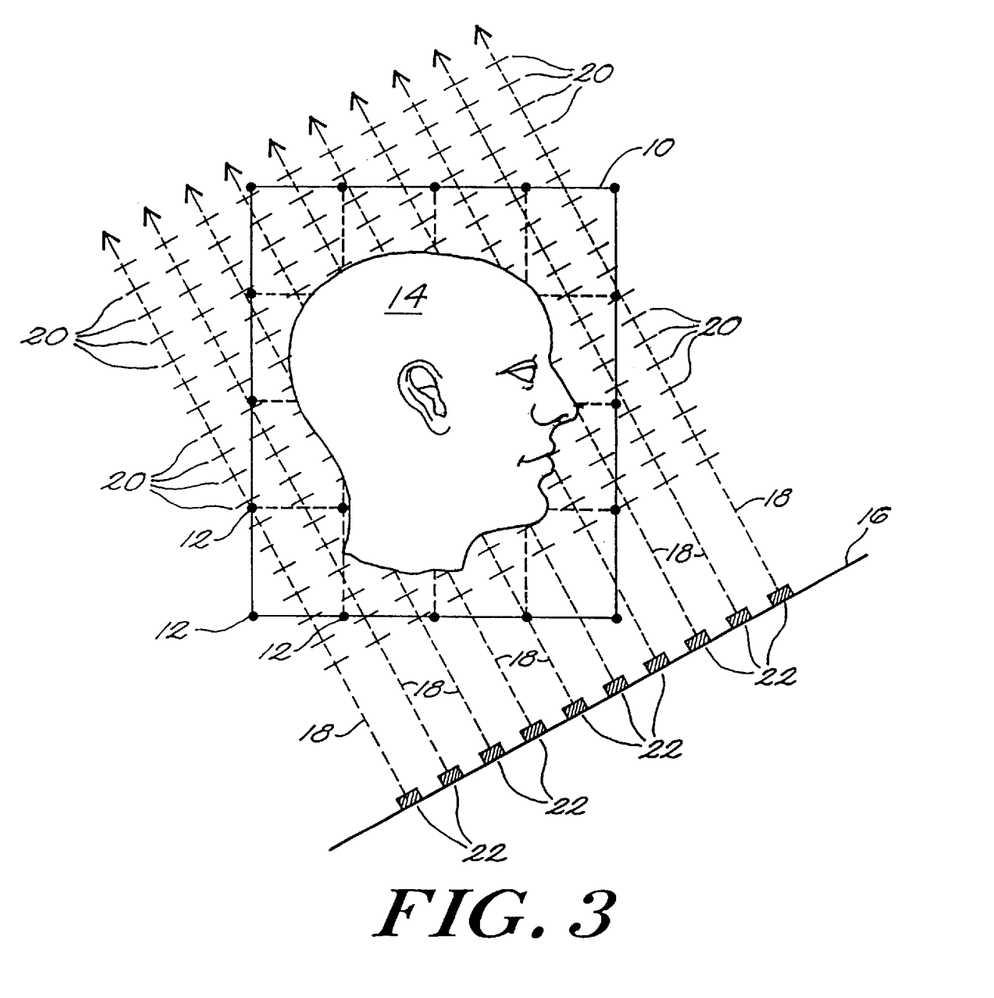
FIG. 3 is a cross-sectional view of the volume data set of FIG. 2.

In order to appreciate more fully the method of ray-casting, FIG. 3 depicts a two-dimensional cross-section of a three-dimensional volume data set 10 of FIG. 2. The first and second dimensions correspond to the dimensions illustrated on the plane of the page. The third dimension of volume data set 10 is perpendicular to the printed page so that only a cross section of the data set can be seen in the figure. Voxel positions are illustrated by dots 12 in the figure. The voxels associated with each position are data values that represent some characteristic or characteristics of a three-dimensional object 14 at fixed points of a rectangular grid in three-dimensional space. Also illustrated in FIG. 3 is a one-dimensional view of a two-dimensional image plane 16 onto which an image of object 14 is to be projected in terms of providing pixels 22 with the appropriate characteristics. In this illustration, the second dimension of image plane 16 is also perpendicular to the printed page.

In the technique of ray-casting, rays 18 are extended from pixels 22 of the image plane 16 through the volume data set 10. Each ray accumulates color, brightness, and transparency or opacity at sample points 20 along that ray. This accumulation of light determines the brightness and color of the corresponding pixels 22. Thus while the ray is depicted going outwardly from a pixel through the volume, the accumulated data can be thought of as being transmitted back down the ray where it is provided to the corresponding pixel to give the pixel color, intensity and opacity or transparency, amongst other parameters.

It will be appreciated that although FIG. 3 suggests that the third dimension of volume data set 10 and the second dimension of image plane 16 are both perpendicular to the printed page and therefore parallel to each other, in general this is not the case. The image plane may have any orientation with respect to the volume data set, so that rays 18 may pass through the volume data set 10 at any angle in all three dimensions.

It will also be appreciated that sample points 20 do not necessarily intersect the voxel 12 coordinates exactly. Therefore, the value of each sample point must be synthesized from the values of voxels nearby. That is, the intensity of light, color, and transparency or opacity at each sample point 20 must be calculated or interpolated as a mathematical function of the values of nearby voxels 12. The re-sampling of voxel data values to values at sample points is an application of the branch of mathematics known as sampling theory. The sample points 20 of each ray 18 are then accumulated by another mathematical function to produce the brightness and color of the pixel 22 corresponding to that ray. The resulting set of pixels 22 forms a visual image of the object 14 in the image plane 16.

Figure 4:
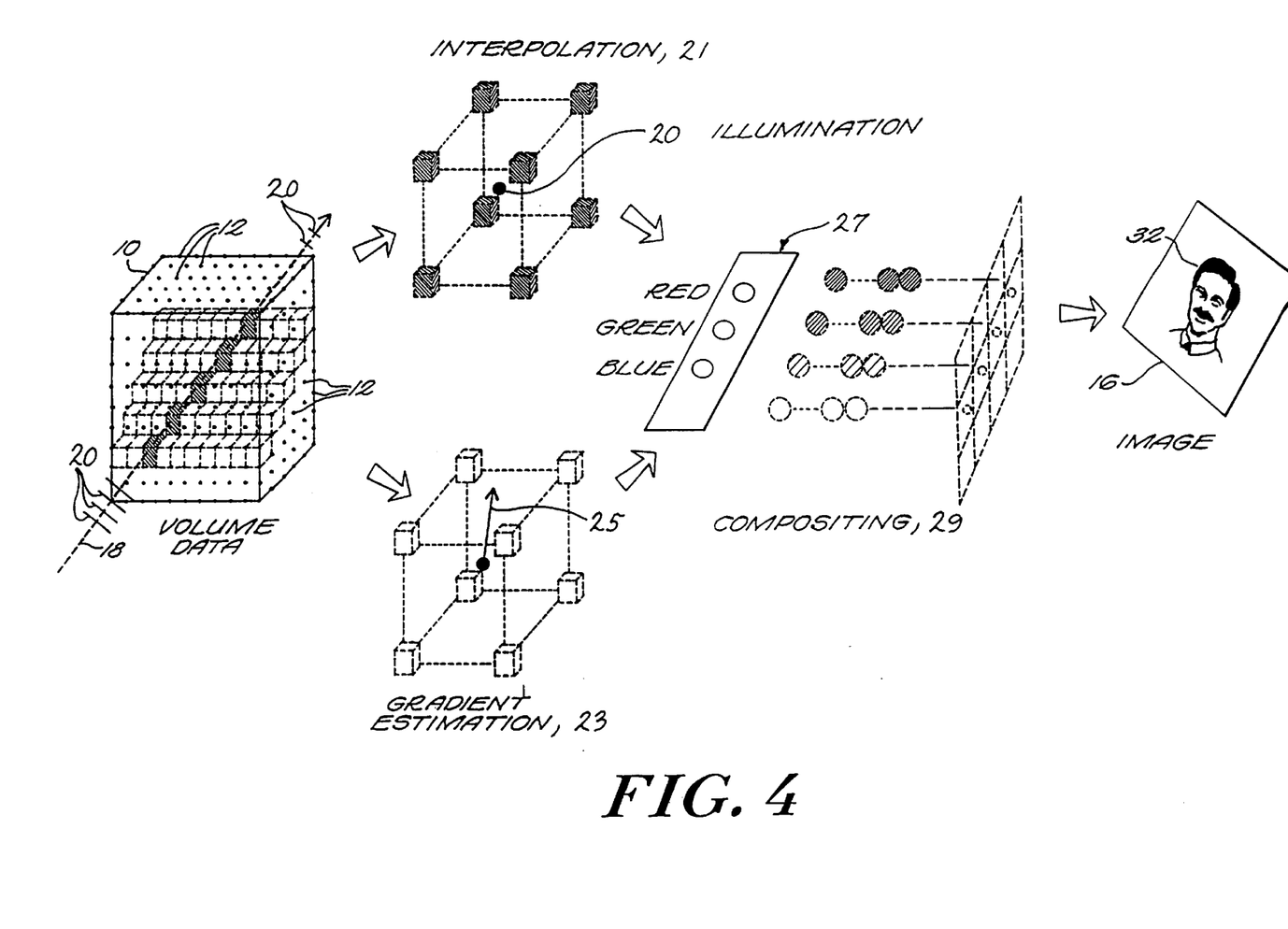
FIG. 4 is a diagrammatic illustration of the processing of an individual ray by ray-casting.

FIG. 4 illustrates the processing of an individual ray. Ray 18 passes through the three-dimensional volume data set 10 at some angle, passing near or possibly through voxel positions 12, and accumulates data at sample points 20 along each ray. The value at each sample point is synthesized as illustrated at 21 by an interpolation unit 103 (see FIG. 5), and its gradient is calculated as illustrated at 23 by a gradient estimation unit 111 (see FIG. 5). The sample point values from sample point 20 and the gradient 25 for each sample point are then processed in the pipeline to assign color, brightness or intensity, and transparency or opacity to each sample. As illustrated at 27, this is done via pipeline processing in which red, green and blue hues as well as intensity and opacity or transparency are calculated. Finally, the colors, levels of brightness, and transparencies assigned to all of the samples along all of the rays are applied as illustrated at 29 to a compositing unit 124 that mathematically combines the sample values into pixels depicting the resulting image 32 for display on image plane 16.

The calculation of the color, brightness or intensity, and transparency of sample points 20 is done in two parts. In one part, a mathematical function such as trilinear interpolation is utilized to take the weighted average of the values of the eight voxels in a cubic arrangement immediately surrounding the sample point 20. The resulting average is then used to assign a color and opacity or transparency to the sample point by some transfer function. In the other part, the mathematical gradient of the sample values at each sample point 20 is estimated by a method such as taking the differences between nearby sample points. It will be appreciated that these two calculations can be implemented in either order or in parallel with each other to produce mathematically equivalent results. The gradient is then used in a lighting calculation to determine the brightness of the sample point. Lighting calculations are well-known in the computer graphics art and are described, for example, in the textbook "Computer Graphics: Principles and Practice," 2nd edition, by J. Foley, A. vanDam, S. Feiner, and J. Hughes, published by Addison-Wesley of Reading, Mass., in 1990.

Figure 5:
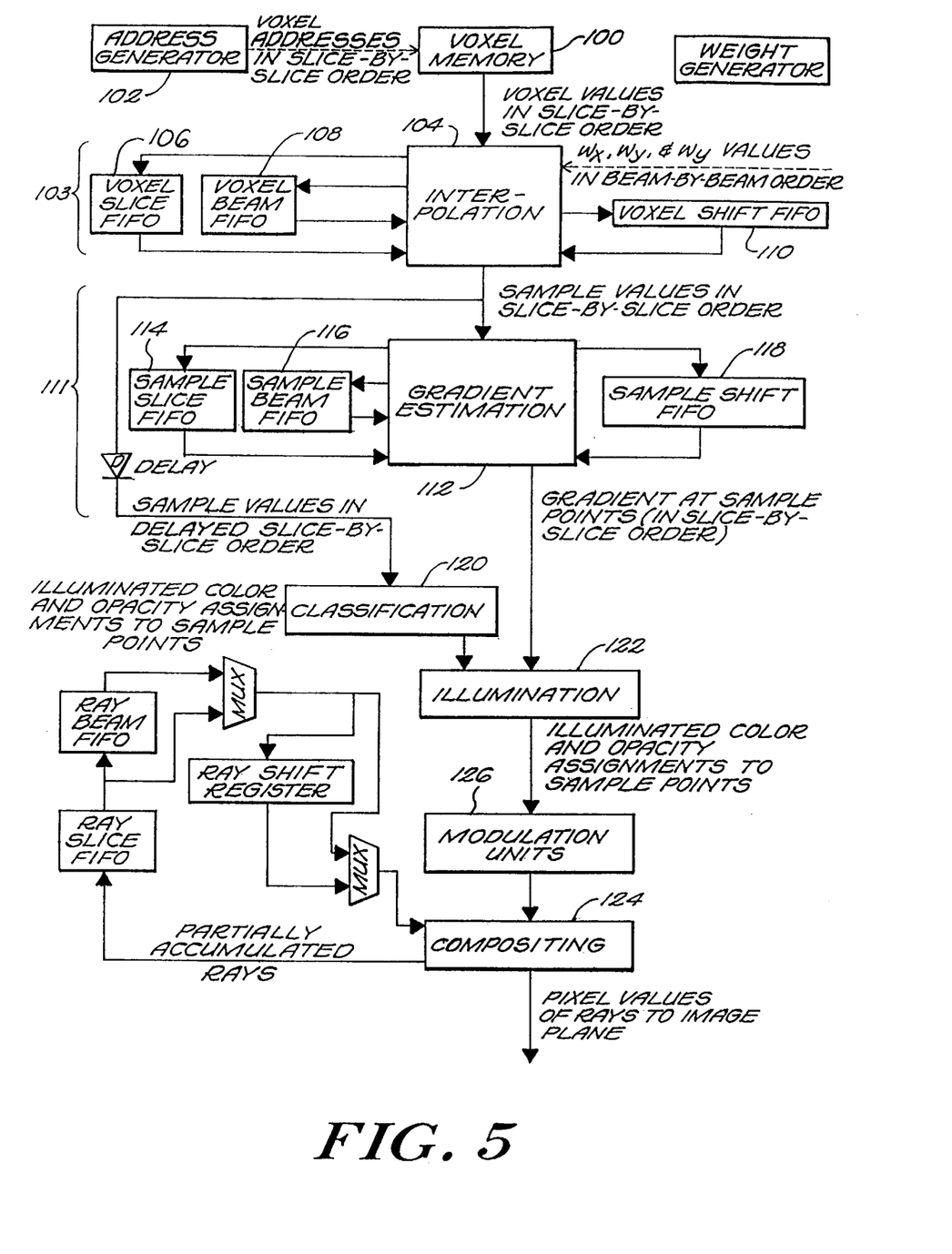
FIG. 5 is a block diagram of a pipelined processing element for real-time volume rendering in accordance with the present invention.

FIG. 5 depicts a block diagram of a pipelined processor appropriate for performing the calculations illustrated in FIG. 4.

The pipelined processor comprises a plurality of pipeline stages, each stage of which holds one data element, so that a plurality of data elements are being processed at one time. Each data element is at a different degree of progress in its processing, and all data elements move from stage to stage of the pipeline in lock step. At the first stage of the pipeline, a series of voxel data values flow into the pipeline at a rate of one voxel per cycle from the voxel memory 100, which operates under the control of an address generator 102. The interpolation unit 104 receives voxel values located at coordinates X, Y and Z in three-dimensional space, where X, Y and Z are each integers. The interpolation unit 104 is a set of pipelined stages that synthesize data values at sample points between voxels corresponding to positions along rays that are cast through the volume. During each cycle, one voxel enters the interpolation unit and one interpolated sample value emerges. The latency between the time a voxel value enters the pipeline and the time that an interpolated sample value emerges depends upon the number of pipeline stages and the internal delay in each stage.

The interpolation stages of the pipeline comprise a set of interpolator stages 104 and three FIFO elements 106, 108, 110 for recirculating data through the stages. In the current embodiment, these are all linear interpolations, but other interpolation functions such as cubic and LaGrangian may also be employed. In the illustrated a embodiment, interpolation is performed in each dimension as a separate stage, and the respective FIFO elements are included to recirculate data for purposes of interpolating between voxels that are adjacent in space but widely separated in the time of entry to the pipeline. The delay of each FIFO is selected to be exactly the amount of time elapsed between the reading of one voxel and the reading of an adjacent voxel in that particular dimension so that the two can be combined in an interpolation function. It will be appreciated that voxels can be streamed through the interpolation stage at a rate of one voxel per cycle with each voxel being combined with the nearest neighbor that had been previously recirculated through the FIFO associated with that dimension.

Three successive interpolation stages, one for each dimension, are concatenated and voxels can pass through the three stages at a rate of one voxel per cycle at both input and output. The throughput of the interpolation stages is one voxel per cycle independent of the number of stages within the interpolation unit and independent of the latency of the data within the interpolation unit and the latency of the recirculation stages within that unit. Thus, the interpolation unit converts voxel values located at integer positions in XYZ space into sample values located at non-integer positions at the rate of one voxel per cycle. In particular, the interpolation unit converts values at voxel positions to values at sample positions disposed along the rays.

Following the interpolation unit 104 is a gradient estimation unit 112, which also comprises a plurality of pipelined stages and recirculation FIFOs. The function of the gradient unit 112 is to derive the rate of change of the sample values in each of the three dimensions. The gradient estimation unit operates in a similar manner to the interpolation unit 104 and computes the rate of change of the sample values in each of the three dimensions. Note, the gradient is used to determine a normal vector for illumination, and its magnitude may be used as a measure of the existence of a surface when the gradient magnitude is high. In the present embodiment the calculation is obtained by taking central differences, but other functions known in the art may be employed. Because the gradient estimation unit is pipelined, it receives one interpolated sample per cycle, and it outputs one gradient per cycle. As with the interpolation unit, each gradient is delayed from its corresponding sample by a number of cycles which is equal to the amount of latency in the gradient estimation unit 112 including respective recirculation FIFOs 114, 116, 118. The delay for each of the recirculation FIFOs is determined by the length of time needed between the reading of one interpolated sample and nearby interpolated samples necessary for deriving the gradient in that dimension.

The interpolated sample and its corresponding gradient are concurrently applied to the classification and illumination units 120 and 122 respectively at a rate of one interpolated sample and one gradient per cycle. Classification unit 120 serves to convert interpolated sample values into colors in the graphics system; i.e., red, green, blue and alpha values, also known as RGBA values. The red, green, and blue values are typically fractions between zero and one inclusive and represent the intensity of the color component assigned to the respective interpolated sample value. The alpha value is also typically a fraction between zero and one inclusive and represents the opacity assigned to the respective interpolated sample value.

The gradient is applied to the illumination unit 122 to modulate the newly assigned RGBA values by adding highlights and shadows to provide a more realistic image. Methods and functions for performing illumination are well known in the art. The illumination and classification units accept one interpolated sample value and one gradient per cycle and output one illuminated color and opacity value per cycle.

Although in the current embodiment, the interpolation unit 104 precedes the gradient estimation unit 112, which in turn precedes the classification unit 120, it will be appreciated that in other embodiments these three units may be arranged in a different order. In particular, for some applications of volume rendering it is preferable that the classification unit precede the interpolation unit. In this case, data values at voxel positions are converted to RGBA values at the same positions, then these RGBA values are interpolated to obtain RGBA values at sample points along rays.

The compositing unit 124 combines the illuminated color and opacity values of all sample points along a ray to form a final pixel value corresponding to that ray for display on the computer terminal or two-dimensional image surface. RGBA values enter the compositing unit 124 at a rate of one RGBA value per cycle and are accumulated with the RGBA values at previous sample points along the same ray. When the accumulation is complete, the final accumulated value is output as a pixel to the display or stored as image data. The compositing unit 124 receives one RGBA sample per cycle and accumulates these ray by ray according to a compositing function until the ends of rays are reached, at which point the one pixel per ray is output to form the final image. A number of different functions well known in the art can be employed in the compositing unit, depending upon the application.

Between the illumination unit 122 and the compositing unit 124, various modulation units 126 may be provided to permit modification of the illuminated RGBA values, thereby modifying the image that is ultimately viewed. One such modulation unit is used for cropping the sample values to permit viewing of a restricted subset of the data. Another modulation unit provides a function to show a slice of the volume data at an arbitrary angle and thickness. A third modulation unit provides a three-dimensional cursor to allow the user or operator to identify positions in XYZ space within the data. Each of the above identified functions is implemented as a plurality of pipelined stages accepting one RGBA value as input per cycle and emitting as an output one modulated RGBA value per cycle. Other modulation functions may also be provided which may likewise be implemented within the pipelined architecture herein described. The addition of the pipelined modulation functions does not diminish the throughput (rate) of the processing pipeline in any way but rather affects the latency of the data as it passes through the pipeline.

In order to achieve a real-time volume rendering rate of, for example, 30 frames per second for a volume data set with 256×256×256 voxels, voxel data must enter the pipelines at $256^3 \times 30$ frames per second or approximately 500 million voxels per second. It will be appreciated that although the calculations associated with any particular voxel involve many stages and therefore have a specified latency, calculations associated with a plurality of different voxels can be in progress at once, each one being at a different degree of progression and occupying a different stage of the pipeline. This makes it possible to sustain a high processing rate despite the complexity of the calculations.

It will be further appreciated that the above described pipelined processor can be replicated as a plurality of parallel pipelines to achieve higher throughput rates by processing adjacent voxels in parallel. The cycle time of each pipeline is determined by the number of voxels in a typical volume data set, multiplied by the desired frame rate, and divided by the number of pipelines. In a preferred embodiment, the cycle time is 7.5 nanoseconds and four pipelines are employed in parallel.

Figure 6:
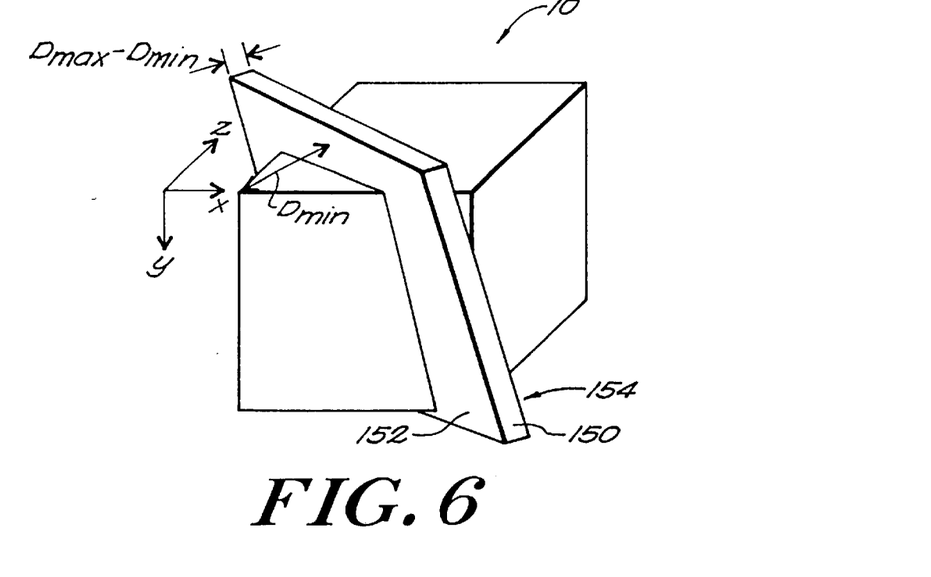
FIG. 6 is a diagram of a cut-plane region that is defined in relation to the volume data set of FIG. 1.

Referring now to FIG. 6, a planar volumetric cut-plane region 150 is employed to crop the volume data 10 to provide a desired view.

In an inclusive mode, only the samples that reside within the cut-plane region 150 are visible. In an exclusive mode, the samples that reside within the cut-plane region 150 are not visible. In other words, either the sample points that are outside of the cut-plane region 150 or the sample points that are inside of the cut-plane region 150 are cropped from the displayed view. Samples are cropped by setting their opacity value ($\alpha$) to zero, where the symbol "$\alpha$" refers to the aforementioned "alpha" or "A" component in an RGBA color system. This cropping of samples is performed within one of the modulation units 126 in the pipeline shown in FIG. 5. As a result, while the cropping results in additional latency in the pipeline, it has a negligible effect on the throughput of the rendering process.

In the illustrated embodiment, the set of samples included within the cut-plane region 150 are defined by the following relation:

$$D_{min} \leq Ax + By + Cz \leq D_{max} \tag{1}$$

where A, B and C define the direction normal to the cut-plane region 150, and $D_{min}$ and $D_{max}$ are the distances from the origin to the faces 152 and 154 respectively in the direction of the normal. Hence, $D_{min} < D_{max}$, and the thickness of the cut-plane region 150 is $D_{max} - D_{min}$. It should be noted that A, B, C, $D_{min}$ and $D_{max}$ may be either positive or negative values.

Whether individual sample points reside inside or outside the cut-plane region 150 is determined by evaluating the expression $L(x,y,z) = Ax + By + Cz$ at each sample point and comparing the result with $D_{min}$ and $D_{max}$. If $L(x,y,z)$ is less than $D_{min}$ or greater than $D_{max}$, the sample is outside of the cut-plane region 150. Otherwise, the sample $S_{x,y,z}$ is inside the cut plane region 150.

Figure 7:
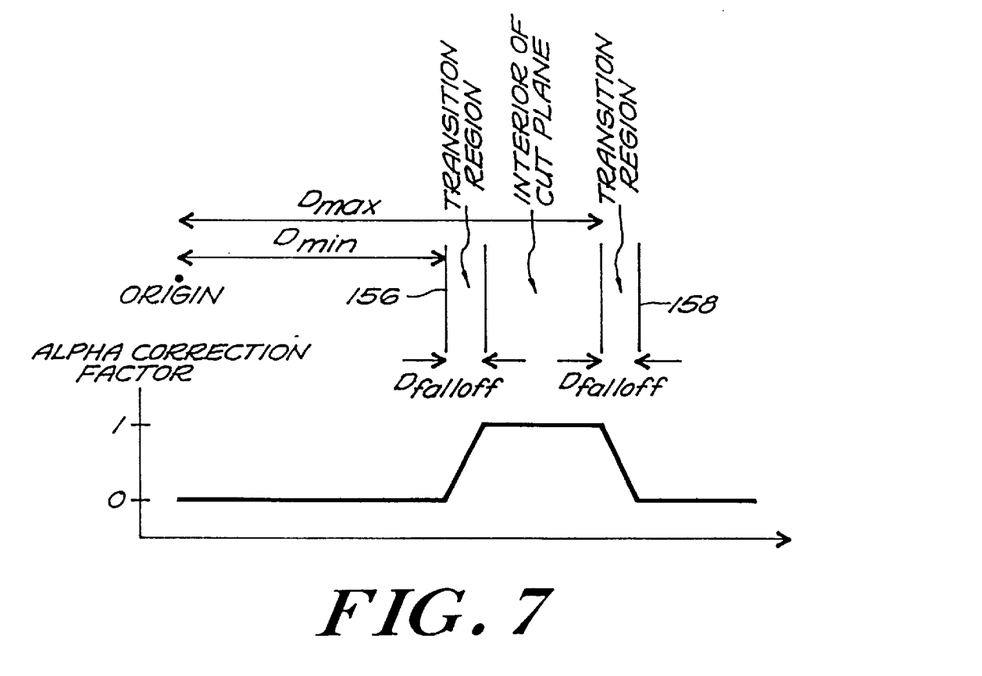
FIG. 7 is a graph that illustrates exclusive mode cut-plane smoothing.

Referring to FIG. 7, the opacities of sample points near the faces 152 and 154 of the cut-plane region 150 are adjusted to provide a smooth appearance to the displayed image. Transition regions 156, 158 at each face 152, 154 of the cut-plane region 150 are defined in which the opacities of the sample points are progressively adjusted. The width $D_{falloff}$ of the transition regions 156, 158 is defined such that $D_{falloff} \geq 0$ and $D_{min} + D_{falloff} \leq D_{max}$. Whether individual sample points reside inside either transition region 156 or 158 is determined by comparing $L(x,y,z)$ with the D values for the transition regions 156 and 158. If $D_{min} \leq L(x,y,z) \leq D_{min} + D_{falloff}$ then sample $S_{x,y,z}$ is positioned in the transition region 156. If $D_{max} \leq L(x,y,z) \leq D_{max} + D_{falloff}$ then sample $S_{x,y,z}$ is positioned in the transition region 158. If $D_{min} + D_{falloff} \leq L(x,y,z) \leq D_{max}$ then the sample $S_{x,y,z}$ is positioned within the cut-plane region 150 but not in either of the transition regions 156 or 158.

Each sample point has an associated opacity value $\alpha_{sample}$. In the inclusive mode, the opacity values $\alpha_{sample}$ of sample points that are outside of the cut-plane region 150 are set to zero. The opacity values $\alpha_{sample}$ of sample points in the interior of the cut-plane region 150 are not changed. The opacity value $\alpha_{sample}$ associated with each sample point in a transition region 156, 158 is adjusted depending on the position of the sample. In the inclusive mode, the opacity values of sample points in the transition regions 156, 158 are adjusted by a linear correction factor that ranges from zero to one in proportion to the proximity of the sample point to the interior of the cut-plane region 150. The opacity values of sample points that are positioned in the transition region 156 nearer distance $D_{min}$ from the origin are adjusted in accordance with Eq. 2 below:

$$\alpha_{adj} = \alpha_{sample}\left(\frac{L(x, y, z) - D_{min}}{D_{falloff}}\right) \quad (2)$$

The opacity values of sample points that are positioned in the transition region 158 nearer to distance $D_{max}$ from the origin are adjusted in accordance with Eq. 3 below:

$$\alpha_{adj} = \alpha_{sample}\left(\frac{(D_{max} + D_{falloff}) - L(x, y, z)}{D_{falloff}}\right) \quad (3)$$

Figure 8:
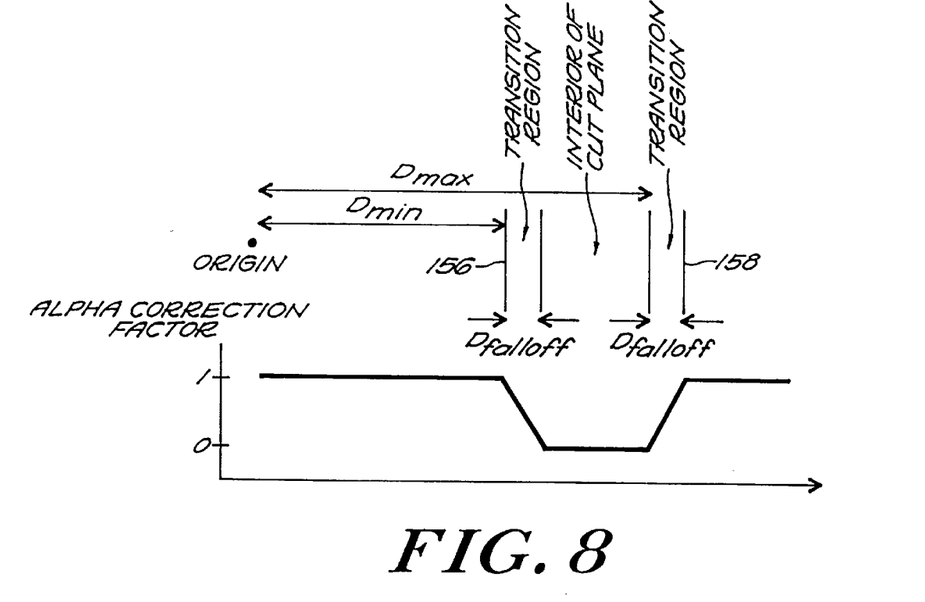
FIG. 8 is a graph that illustrates inclusive mode cut-plane smoothing.

Referring to FIG. 8, in the exclusive mode the opacity values of sample points in the transition regions 156, 158 are adjusted by a linear correction factor ranging from one to zero in proportion to the proximity of the sample point to the interior of the cut-plane region 150. In the illustrated embodiment, the opacity values of samples that are positioned in the transition region 156 nearer to distance $D_{min}$ from the origin are adjusted in accordance with Eq. 4 below:

$$\alpha_{adj} = \alpha_{sample}\left(\frac{(D_{min} + D_{falloff}) - L(x, y, z)}{D_{falloff}}\right) \quad (4)$$

The opacity values of samples that are positioned in the transition region 158 nearer to distance $D_{max}$ from the origin are adjusted in accordance with Eq. 5 below:

$$\alpha_{adj} = \alpha_{sample}\left(\frac{L(x, y, z) - D_{max}}{D_{falloff}}\right) \quad (5)$$

The opacity values of sample points that are positioned in the interior of the cut-plane region 150 but not in a transition region are set to zero. The opacity values of sample points that are not in the cut-plane region 150 are not changed.

Although in the illustrated embodiment the same linear adjusting function is used in both transition regions 156 and 158, it will be appreciated that in alternative embodiments different adjustment functions may be employed, and it may be desirable to use different adjustment functions in the separate transition regions 156 and 158.

In the illustrated embodiment, the value of $L(x,y,z)$ is evaluated incrementally as samples flow through the modulation unit 126. That is, the expression $L(x_i, y_j, z_k)=x_i+y_j+z_k$ is evaluated by adding a constant to a previous value of $L(x_{i-1}, y_j, z_k)$, $L(x_i, y_{j-1}, z_k)$ or $L(x_i, y_{j-1}, z_k)$. Consequently, multiplication operations are avoided, so that the circuitry required to evaluate the sample point distance is reduced.

Assume for the moment that samples are spaced one unit of distance apart in each dimension. Then the value of $L(x+1, y, z)$ is given by:

A(x+1)+By+Cz=Ax+By+Cz+A, that is, $L(x, y, z)+A$, for any sample point at position (x,y,z). Likewise, L(x,y+1,z)=L(x,y,z)+B L(x,y,z+1)=L(x,y,z)+C Therefore, if samples are spaced one unit apart in each dimension, then in order to calculate the next value in any direction it is sufficient to simply add the dimensional coefficient of the cut plane equation to the value of the cut plane equation in the previous sample position in that dimension.

More generally, suppose that samples are organized in uniformly spaced slices perpendicular to the z-axis, such that the slices are distance $z_{step}$ apart. Suppose further that each slice is organized into rows that are distance $y_{step}$ apart, and finally that within each row, samples are spaced a distance $x_{step}$ apart. Then the value of $L(x_{i+1}, y_j, z_k)$ can be calculated incrementally from the value of $L(x_i, y_j, z_k)$ as:

$$L(x_{i+1}, y_j, z_k) = Ax_{i+1} + By_j + Cz_k$$
$$= A(x_i + x_{step}) + By_j + Cz_k$$
$$= Ax_i + By_j + Cz_k + Ax_{step}$$
$$= L(x_i, y_j, z_k) + Ax_{step}$$

for any $y_j$ and $z_k$. Likewise, the value of $L(x_i, y_{j+1}, z_k)$ can be calculated incrementally from the value of $L(x_i, y_j, z_k)$ as:

$$L(x_i, y_{j+1}, z_k) = Ax_i + By_{j+1} + Cz_k$$
$$= Ax_i + B(y_j + y_{step}) + Cz_k$$
$$= Ax_i + By_j + Cz_k + By_{step}$$
$$= L(x_i, y_j, z_k) + By_{step}$$

for any $x_i$ and $z_k$. By the same method, the value of $L(x_i, y_j, z_{k+1})$ can be calculated incrementally from the value of $L(x_i, y_j, z_k)$ as:

$$L(x_i, y_j, z_{k+1}) = Ax_i + By_j + Cz_{k+1}$$
$$= Ax_i + By_j + C(z_k + z_{step})$$
$$= Ax_i + By_j + Cz_k + Cz_{step}$$
$$= L(x_i, y_j, z_k) + Cz_{step}$$

for any $x_i$ and $y_j$.

It will be appreciated that to calculate the value of $L(x,y,z)$ for any sample at position (x,y,z), it is sufficient to start with an initial value, then incrementally calculate the polynomial L for all samples to the left, above, and in front of sample (x,y,z). Because the volume data is traversed in an orderly fashion left to right, top to bottom, and front to back, the value of $L(x,y,z)$ can be calculated at each sample point during the traversal. It will also be appreciated that in other embodiments, the volume data set may be traversed in different orders, but nevertheless the expression $L(x,y,z)$ can be calculated in an incremental fashion during the traversal.

Figure 9:
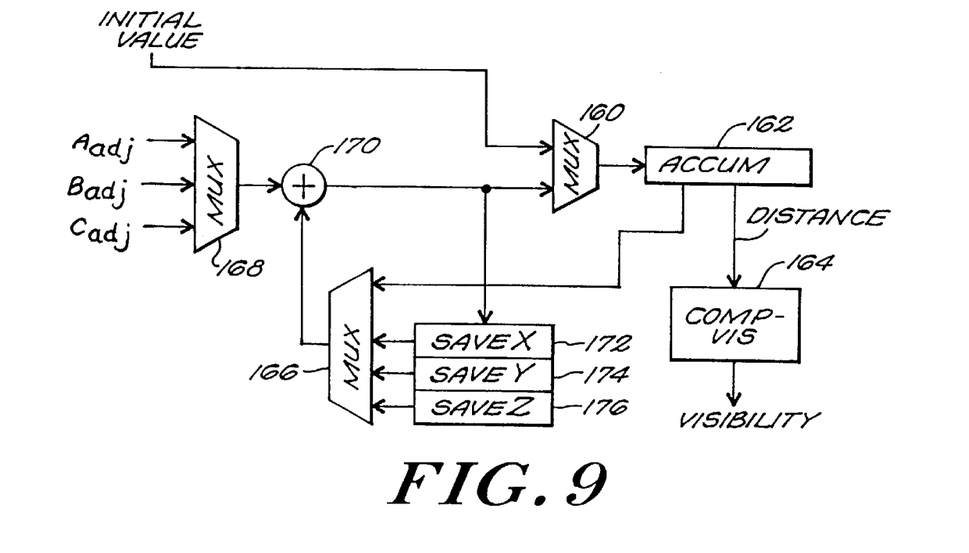
FIG. 9 is a schematic diagram of control logic that implements the cut-plane functionality.

FIG. 9 illustrates a circuit used in a modulation unit 126 of a processing pipeline for the purpose of adjusting the visibility of samples inside and outside of the cut-plane region 150 in accordance with the above Equations (2)–(5). The value of $L(x_0, y_0, z_0)$ at the first sample point $(x_0, y_0, z_0)$ of the traversal of the volume is given as an input value labeled initialValue, that is, initialValue=$Ax_0+By_0+Cz_0$.

The sample position $(x_0, y_0, z_0)$ is not necessarily the origin of the volume data set, but merely the first sample accumulated along the first ray to be processed. The initialValue is provided to a multiplexer 160 to be loaded into an accumulator 162. As described below, the accumulator 162 is used to continually re-evaluate the expression $L(x,y,z)$=$Ax+By+Cz$ representing the sample distance from the origin in the direction of the cut-plane region 150. The initialValue is also loaded into registers labeled saveX 172 and saveY 174, used in a manner described below. A subsequent value is loaded into register saveZ 176 at a later time, also as described below. Input values $A_{adj}$, $B_{adj}$, and $C_{adj}$, input by control software, are respectively equal to the values $Ax_{step}$, $By_{step}$, and $Cz_{step}$ shown in the equations above.

For each new sample, the accumulator 162 is loaded with the sum of the outputs of multiplexers 166 and 168 as calculated by an adder 170. The control logic first steps in the X direction by repeatedly adding the contents of the accumulator 162 to the $A_{adj}$ coefficient and reloading the accumulator 162 via multiplexer 160. When the end of a row is reached and a new row begun, the distance for sample (0,1,0) is computed by adding the $B_{adj}$ coefficient to the contents of the saveX register 172, into which had been previously stored the distance for sample (0,0,0). At the same time, this calculated distance for sample (0,1,0) is stored in the saveX register 172 to be used at the beginning of the next row. This sequence is repeated for each row in a slice.

When the end of a slice is reached and a new slice begun, the distance for sample (0,0,1) is computed by adding the $C_{adj}$ coefficient to the contents of the saveY register 174, into which had been previously stored the distance for sample (0,0,0). At the same time, this calculated distance for sample (0,0,1) is stored in the saveY register 174 to be used at the beginning of the next slice. This sequence is repeated for each slice in a section.

In the present embodiment, the volume data set is processed in sections. That is, the volume data set is partitioned into sections of a predetermined size along the X axis, and all rays in all slices of a section are processed before any rays of any slice of a subsequent section. In FIG. 9, register 176 labeled saveZ contains the distance of the last sample in the first row of the first slice of a section, so that the distance of the first sample of the next section can be obtained. In other words, let $(x_{last}, y_0, z_0)$ represent the coordinates of the last sample of the first row of the first slice of the first section. When the distance $L(x_{last}, y_0, z_0)$ is calculated by adder 170, it is stored in the saveZ register 176 as well as being passed to multiplexer 160. At the beginning of the next section, the value stored in the saveZ register 176 is selected by multiplexer 166, and the adder 170 adds the value $A_{adj}$ to obtain the distance of the first sample of that new section. This process is repeated at the end of the first row of the new section, so that a new value is stored in the saveZ register 176 for the subsequent section.

The value in the accumulator 162 represents the distance $L(x,y,z)$ of each sample $(x,y,z)$ from the cut plane, as that sample is processed. This value is coupled to a visibility calculator 164, which computes an 8-bit visibility factor for each sample based upon $D_{min}$, $D_{max}$, $D_{falloff}$, and the sample distance as it exists in the accumulator 162. In particular, the visibility calculator 164 implements Equations (2)–(5) to determine a final value of the opacity ($\alpha$) of the sample point.

FIG. 9 and the accompanying text above describe functionally how the expression $Ax+By+Cz$ is repeatedly evaluated. In embodiments using parallel processing elements it may be desirable to calculate several visibility values simultaneously. This can be readily accomplished by straightforward extension of the logic shown in FIG. 9. For example, several visibility calculators can be employed, each one receiving a corresponding distance which may be provided by a separate accumulator or derived from the distance in a single accumulator. If a single accumulator is used, it is necessary to step the accumulator by a scaled value representing the degree of parallelism. For example, if 4 calculations are performed simultaneously in the X direction, accumulator 162 is stepped in increments of $4A_{adj}$. The accumulated value represents the distance of the sample being processed by the left most or "zeroth" pipeline. Offsets of $1A_{adj}$, $2A_{adj}$, and $3A_{adj}$ are added to the value in accumulator 162 to obtain the distances of the corresponding samples in the adjacent three pipelines.

It will be appreciated that the circuit of FIG. 9 and the foregoing description represents a modulation unit 126 in one or more processing pipelines for projecting a volume data set onto a two-dimensional image plane. Just as each pipeline is capable of accepting one voxel per cycle accumulating the RGBA value of a sample point during each sample, so the cut-plane modulation stage is also capable of determining the visibility of one sample during each cycle. Therefore, the addition of the cut-plane modulation stage to a processing pipeline does not reduce the throughput of the pipeline but only increases the latency by the length of time needed to add and accumulate values as shown in FIG. 9. Typically this latency is one cycle or a very small number of cycles. Therefore, the visibility testing of the cut-plane equation can be completed in real-time.

Although in the foregoing description the use of a single cut-plane region 150 is described, it may be desirable in alternative embodiments to employ multiple cut-plane regions to achieve greater flexibility in the presentation of volume data. Also, a cut-plane region may be used in conjunction with other cropping techniques to enable an even wider variety of presentations.

Embodiments consistent with the present invention having been described, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. Apparatus for modifying a volume data set in real-time to display a cut-plane-modified version thereof, the apparatus comprising a pipelined volume data processor including cut-plane control logic operative to perform the steps of:

establishing a cut-plane region of the volume data set, the cut-plane region being defined by a set of coefficients of a plane equation and minimum and maximum distance values respectively representing the value of the plane equation at two parallel opposing outer faces of the cut-plane region; and for each of a sequence of samples of the volume data set, performing the steps of:
   (i) evaluating the plane equation for the coordinates of the sample;
   (ii) comparing the result of the evaluating step with the minimum and maximum distance values to determine whether the sample lies in the cut-plane region; and
   (iii) adjusting the visibility of the sample depending on whether the sample is determined to lie in the cut-plane region.

2. Apparatus according to claim 1, wherein the volume data processor comprises one or more processing pipelines each including a plurality of pipelined processing elements, and wherein the cut-plane control logic is included within a processing element in some or all of the processing pipelines.

3. Apparatus according to claim 1, wherein the sequence of samples result from scanning the volume data along separate dimensions, and wherein the cut-plane control logic is operative during the step of evaluating the plane equation to continually accumulate the values of the cut-plane equation in an order indicated by the ordering of the samples in the sequence.

4. Apparatus according to claim 3, wherein the cut-plane control logic comprises:

an accumulator operative to continually accumulate distance values respectively associated with corresponding ones of the sequence of samples;

a 2-input adder operative to generate a sum to be loaded into the accumulator;

a first selector operative to select among coefficient values defining the cut-plane region, the output of the first selector being provided to one input of the adder;

a set of registers operative to be loaded from the adder to save respective intermediate accumulated values in corresponding dimensions of the volume data;

a second selector operative to select among a set of inputs including the output of the accumulator and the saved values in the registers, the output of the second selector being provided to the other input of the adder; and visibility calculation logic operative in response to the minimum and maximum distance values and the output of the accumulator to generate values used to adjust the visibility of the samples.

5. Apparatus according to claim 1 operative in either an inclusive or exclusive mode, wherein the cut-plane control logic is operative during the visibility-adjusting step to set the visibility of the sample to zero if either (i) the apparatus is operating in the exclusive mode and the sample is determined to lie in the cut-plane region, or (ii) the apparatus is operating in the inclusive mode and the sample is determined to lie outside the cut-plane region.

6. The apparatus of claim 1 wherein the cut-plane control logic is further operative to perform the step of establishing a falloff region at each face of the cut-plane region, each falloff region being defined by a respective falloff distance value, and wherein the comparing step comprises the step of comparing the result of the evaluating step with the minimum, maximum and falloff distance values to determine whether the sample lies in a falloff region, and wherein the visibility-adjusting step comprises the step of applying a linear correction factor to the visibility of the sample if the sample is in a falloff region, the correction factor ranging from one to zero depending on the location of the sample in the falloff region.

7. A method of modifying a volume data set in real-time to display a cut-plane-modified version thereof, comprising the steps of:

establishing a cut-plane region of the volume data set, the cut-plane region being defined by a set of coefficients of a plane equation and minimum and maximum distance values respectively representing the value of the plane equation at two parallel opposing outer faces of the cut-plane region; and for each of a sequence of samples of the volume data set, performing the steps of:

(i) evaluating the plane equation for the coordinates of the sample;

(ii) comparing the result of the evaluating step with the minimum and maximum distance values to determine whether the sample lies in the cut-plane region; and (iii) adjusting the visibility of the sample depending on whether the sample is determined to lie in the cut-plane region.

8. A method according to claim 7, wherein the sequence of samples result from scanning the volume data along separate dimensions, wherein the step of evaluating the plane equation comprises the step of continually accumulating the values of the cut-plane equation in an order indicated by the ordering of the samples in the sequence.

9. A method according to claim 7 executable in either an inclusive or exclusive mode, and wherein the visibility-adjusting step comprises the step of setting the visibility of the sample to zero if either (i) the method is being executed in the exclusive mode and the sample is determined to lie in the cut-plane region, or (ii) the method is being executed in the inclusive mode and the sample is determined to lie outside the cut-plane region.

10. The method of claim 7, further comprising the step of establishing a falloff region at each face of the cut-plane region, each falloff region being defined by a respective falloff distance value, and wherein the comparing step comprises the step of comparing the result of the evaluating step with the minimum, maximum and falloff distance values to determine whether the sample lies in a falloff region, and wherein the visibility-adjusting step comprises the step of applying a linear correction factor to the visibility of the sample if the sample is in a falloff region, the correction factor ranging from one to zero depending on the location of the sample in the falloff region.

11. A method according to claim 7, wherein the cut-plane region is a first cut-plane region defined by a first set of coefficients of a first plane equation and first minimum and maximum distance values, and further comprising the steps of:

establishing one or more additional cut-plane regions of the volume data set, each additional cut-plane region being defined by a corresponding set of coefficients of a corresponding plane equation and corresponding minimum and maximum distance values respectively representing the value of the corresponding plane equation at two parallel opposing outer faces of the cut-plane region; and for each of a sequence of samples of the volume data set and each additional cut-plane region, performing the steps of:

(i) evaluating the plane equation for the coordinates of the sample;

(ii) comparing the result of the evaluating step with the minimum and maximum distance values to determine whether the sample lies in the cut-plane region; and (iii) adjusting the visibility of the sample depending on whether the sample is determined to lie in the cut-plane region.

* * * * *